April 9, 1929.  G. F. PINSUTI  1,708,106
MOLDING MACHINE
Filed July 24, 1926  5 Sheets-Sheet 5

INVENTOR
Giuseppe F. Pinsuti
BY
HIS ATTORNEYS

Patented Apr. 9, 1929.

1,708,106

UNITED STATES PATENT OFFICE.

GIUSEPPE F. PINSUTI, OF NEW YORK, N. Y.

MOLDING MACHINE.

Application filed July 24, 1926. Serial No. 124,571.

This invention relates to a molding machine and more especially to an apparatus for mechanically molding door knobs and similar articles from any one of the numerous compositions of material from which articles of this general nature are usually manufactured. In carrying out the invention the apparatus includes a revoluble drum adapted to be turned through partial revolutions at predetermined intervals and in which any one of a plurality of mold frames is placed, together with devices whereby when the cylinder is in one position the material from which the article to be made is molded is placed in a mold; in another position of the cylinder the material is pressed to shape and otherwise formed, while in another position the finished article is delivered to a conveyor or carrier, as will be hereinafter more particularly described.

By reference to the drawing it will be seen that in carrying out my invention the apparatus made in accordance therewith includes a machine frame having a base 10 and oppositely disposed and suitably spaced side walls 11 and 12 which may be secured to one another by cross bars or braces 13, 14. Extending between the side walls 11 and 12 there is a drive shaft 15 which is journaled in bearings 16 provided therefor in these side walls. Also mounted in the side walls there are stub shafts 17 and 18 mounted respectively in bearings 19 and 20 provided therefor in these side walls. There is also an auxiliary shaft 21 extending between the side walls and journaled in bearings 22 provided therefor in these side walls.

Mounted on the drive shaft 15 there is a pulley 23 in order by a suitable belt or otherwise, to turn the drive shaft from a suitable source of power. Also mounted on the drive shaft 15 there is a mutilated gear wheel 24. This gear wheel 24 meshes with a gear wheel 25 mounted to turn freely on a shaft 26 which is journaled in the frame of the machine. The gear wheel 25 meshes with a gear wheel 27 mounted on the stub shaft 17. The gear 27 may be secured to the stub shaft by means of a key or otherwise. The gear 27 meshes with a gear 28 suitably fixed to the auxiliary shaft 21. On the drive 15 there is also a gear 24' meshing with a gear 25' fixed on the shaft 26. The gear 25' meshes with a gear 29 secured on a shaft 30 which is journaled in bearings provided therefor in the frame of the machine, and the gear 29 meshes with a gear 31 which is secured on a cam shaft 32 also journaled in suitable bearings provided therefor in an extension 33 of the side walls of the machine.

Figure 4:
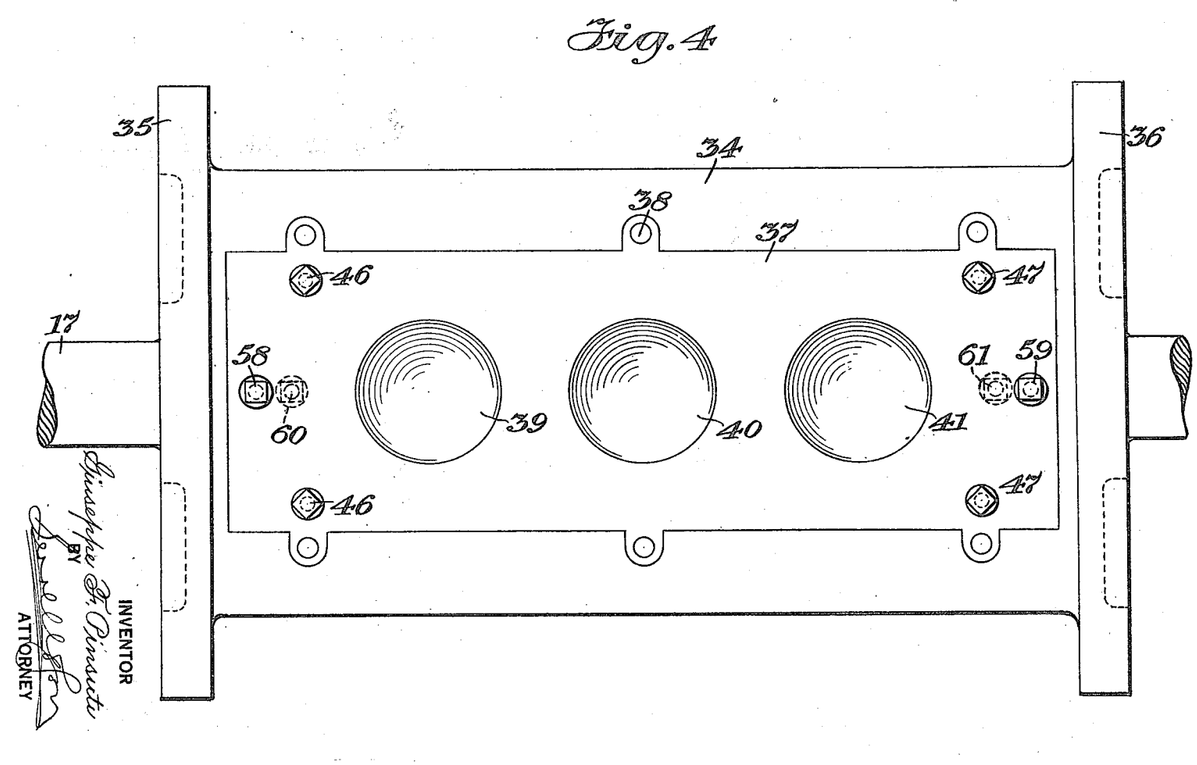
Fig. 4 is a plan of the cylinder and the parts associated therewith.
Figure 5:
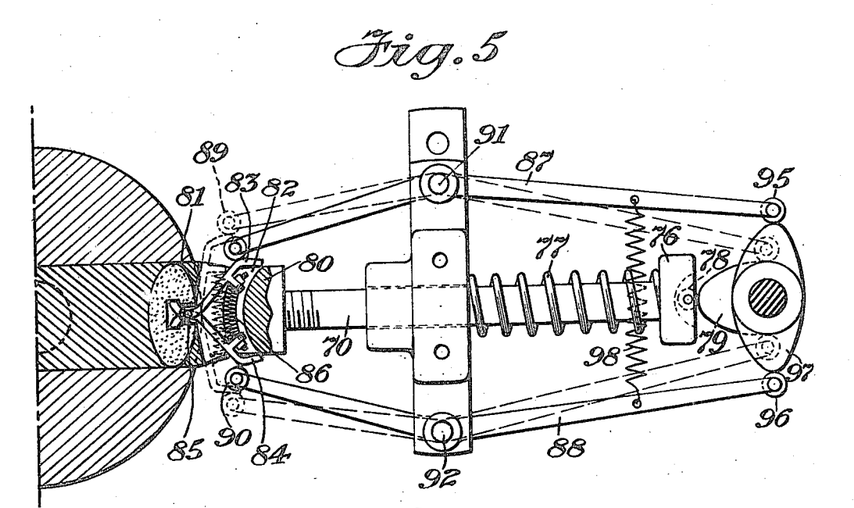
Fig. 5 is a sectional elevation illustrating the devices for forming an undercut recess in the knob which the apparatus is adapted to form.
Figure 6:
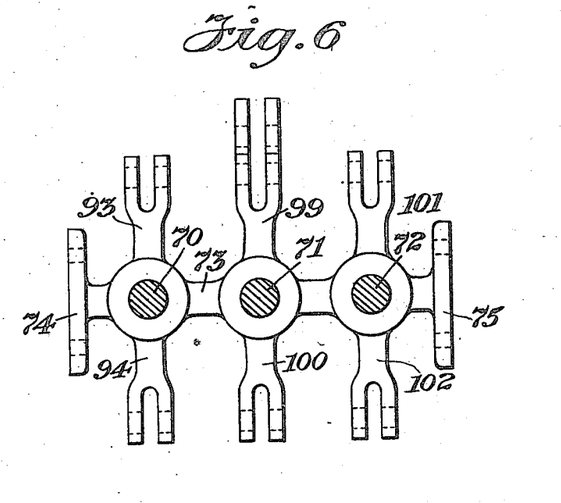
Fig. 6 is an elevation and partial section of the lever bracket and shafts for moving parts of the molds.

Mounted on the stub shafts 17 and 18 I employ a cylinder 34. The heads 35 and 36 of this cylinder are suitably connected to these stub shafts 17 and 18 so as to turn therewith. The cylinder is provided with an opening or pocket adapted to receive and contain any one of a number of sets of molding devices. As illustrated, one of these molding devices includes a plate 37 the outer surface of which is made to conform with the surface of the cylinder so that when in position it completes the continuity thereof and is held in position in the cylinder by means of bolts or screws 38 or otherwise. In this plate 37 there is a plurality of apertures 39, 40 and 41 preferably in alignment as clearly shown in Fig. 4 of the drawing. Passing through these apertures there are mold plungers 42, 43, and 44. At their lower or inner ends these mold plungers are fixed in a base 45 which is movable in the opening in the cylinder. The base 45 and the mold plungers are normally maintained yieldingly in position by sets of bolts 46, 47 and springs 48, 49 associated therewith. Each of these bolts passes through a bolt hole provided therefor in the plate 37 and has associated therewith one of the springs for normally maintaining the heads of the bolts against the outer surface of the plate or within a recess in the same provided for this purpose, whereby the outer ends of the mold plungers are normally maintained in position within the openings in the plate 37. It will be understood that the outer ends of these mold plungers are recessed in such a manner as to shape a part of the article to be molded. Entering the opening in the cylinder from the opposite side there is a corresponding molding frame and parts associated therewith. This includes a plate 50 in the openings in which there are mold plungers 51, 52 and 53. This mold frame also includes a base 50' in which the mold plungers 51, 52 and 53 at their inner ends are secured. Like the other mold frame the parts comprising this one are normally maintained yieldingly in position by sets of bolts 54, 55 and springs 56, 57. The bolts 54 and 55 pass through bolt holes provided therefor in the plate 50 and are secured in the base 50' which with the mold plungers 51, 52 and 53 are normally held in position yieldingly by the springs 56 and 57. It will be understood that while I have illustrated the apparatus as being fitted with sets of three mold plungers, any desired number thereof may be employed, and the outer ends thereof may be recessed as occasion requires. In operating the apparatus the mold plungers are limited in their inward movement by the heads of the bolts so that the outer ends thereof lie in the openings forming part of the molds in the plates of the mold frame. In delivering the molded article from the molds the mold plungers are moved radially relatively to the cylinder by suitable devices as hereinafter described through the sets of bolts 58, 59 and 60 and 61. The bolts 58 and 59 pass through bolt holes provided therefor in the plate 37, also through bolt holes provided therefor in the base 45, and are secured by being turned down in tapped openings or otherwise in the base 50'. In a similar manner the bolts 60 and 61 pass through bolt holes provided therefor in the plate 50 and also through bolt holes provided therefor in the base 50' and are turned down into tapped openings provided therefor in the base 45.

In the upper portion of the frame of the apparatus there is a hopper 62. The side walls of this hopper are indicated at 63 and 64 and also as illustrated, are preferably mounted on the auxiliary shaft 21 by means of lugs or bosses 65, 66 through which the auxiliary shaft passes. The lower ends of the walls of the hopper are made to conform to and lie in contact with or in close proximity to the surface of the cylinder so that the surface of the cylinder may be considered as forming the bottom of the hopper. Mounted on the auxiliary shaft 21 within the hopper 62 there is a hub 67 provided with spaced arms 68 each carrying a blade or paddle 69. The composition of material from which the articles are to be molded is placed in a hopper and agitated therein and also forced to position in the molding devices by means of these paddles.

Irrespective of the number of mold plungers which may be employed with each molding device, there is a reciprocating shaft and head for each mold plunger, for example, there is a reciprocating shaft 70 for the mold plunger 42, a similar shaft 71 for the mold plunger 43, and a corresponding shaft 72 for the mold plunger 44. Each of these reciprocating shafts is provided with a compressor head, means for actuating the same, and also with devices for forming an undercut recess in the article to be molded, but as each set of these devices is the same, but one of them will be described in detail. The reciprocating shafts 70, 71 and 72 pass through and are journaled in a bracket 73 having end flanges 74 and 75 by which or other similar and suitable means the bracket is connected and secured in position to the side walls of the apparatus. The reciprocating shaft 70 is provided at one end with a head 76 and by means of a spring 77, or otherwise, a roller 78 mounted in the head 76 is maintained in contact with the face of a cam 79 mounted on the cam shaft 32. At the opposite end thereof the reciprocating shaft 70 is fitted with a compressor head 80. The extremity of this compressor head is adapted to enter the opening 39 in the plate 37 and is suitably recessed as indicated at 81 to cooperate with the recessed outer end of the mold plunger 42 to shape a knob or other article to be formed in the apparatus. This head 80 is slotted as indicated at 82, and within the slot 82 there are oppositely disposed arms 83 and 84 pivotally mounted at 85 and normally maintained in an initial position by means of a spring 86 or otherwise. The outer ends of the arms 83 and 84 are preferably curved in opposite directions and when in their initial positions the extremities thereof are preferably in alignment and form a plunger which enters the adjacent side of the material being molded. After penetrating this material a predetermined distance the opposite ends of the arms are moved inwardly or toward each other by means of the levers 87 and 88 so as to cause the extremities of the short curved ends of these arms to spread apart to form an undercut recess in the material being molded. The levers 87 and 88 at the ends adjacent the arms 83 and 84 are provided with rollers 89 and 90 respectively adapted to engage the extremities of the long ends of these arms to actuate the same as hereinbefore described. These levers 87 and 88 are pivotally mounted as indicated at 91 and 92 in arms 93 and 94 formed as part of the bracket 73, and at their other extremities the levers 87 and 88 are provided with rollers 95 and 96 which are normally maintained against the surface of a cam 97 by means of a spring 98 extending between these levers or otherwise, the cam 97 being suitably fixed on the cam shaft 32. From the foregoing it will be understood that levers similar to the levers 87 and 88 are pivotally connected in arms 99 and 100, and 101 and 102 for operating similar parts employed to cooperate with the mold plungers 43 and 44. It will furthermore be understood that the same devices cooperating with the mold plungers 42, 43, 44 also cooperate respectively with the mold plungers 51, 52 and 53.

Figures 1, 7:
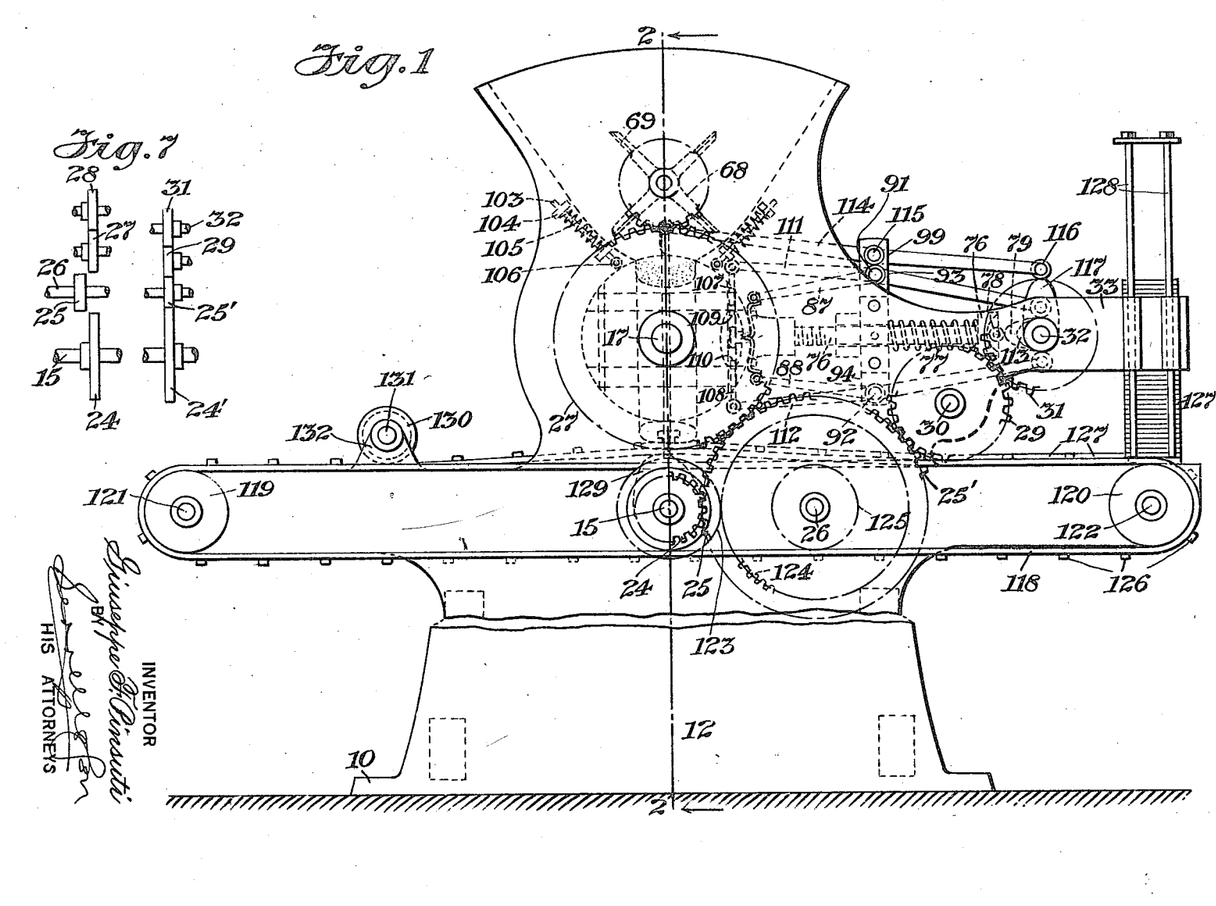
Figure 1 is a side elevation illustrating a molding machine made in accordance with my present invention.
Fig. 7 is a diagrammatic elevation of the gears employed.
Figure 2:
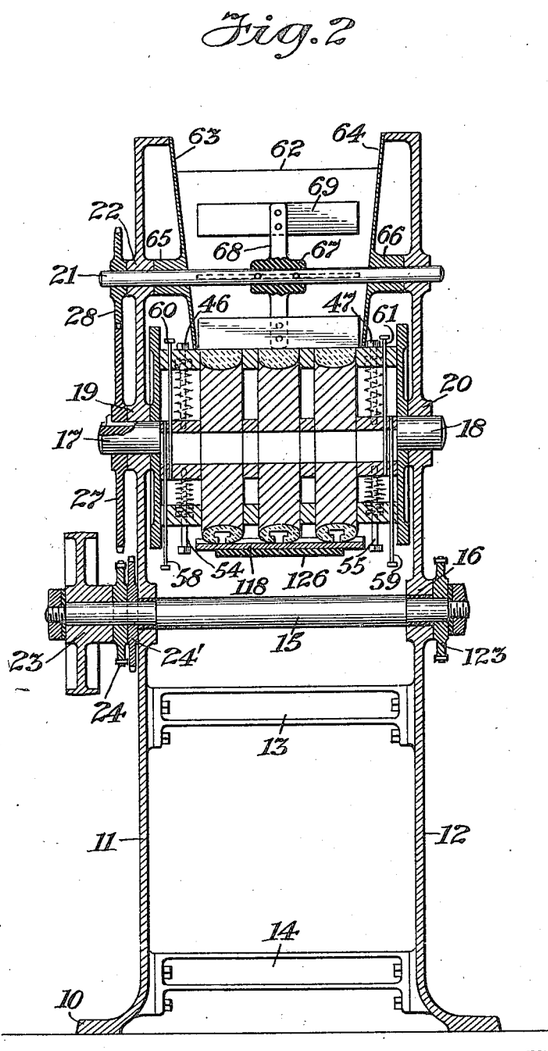
Fig. 2 is a section on line 2—2, Fig. 1.

Associated with the frame and lying on the exterior of the hopper I employ devices for scraping or cleaning the edges of the openings 39, 40 and 41 in the mold frame. As illustrated, and as particularly shown in Fig. 1 of the drawing, I employ rods 103 mounted to slide in bosses 104 and actuated by springs 105 to maintain the rollers carried by the lower ends of the rods in contact with the surface of the cylinder and the plates of the mold frames so as to yieldingly bear against the outer surfaces thereof and in so doing to scrape or clean the edges of the openings 39, 40 and 41 as aforesaid, it being understood that the rollers 106 extend longitudinally of the cylinders so that all these openings are simultaneously cleaned or scraped.

In order to maintain the cylinder in a fixed position while the knobs or other devices formed by the apparatus are being pressed to shape, I may employ a set of pins indicated at 107 and 108 and adapted respectively to enter recesses 109 and 110 in the said cylinder to fix the same in position, that is to prevent the same from moving revolubly while the material is being pressed to shape. These pins may also be made to extend into the material to form recesses or notches therein if so desired. These pins 107 and 108 are operated by means of levers 111 and 112. It will be understood that there is a set of pins and corresponding levers for each of the sets of mold plungers, the levers 111 and 112 being associated with the mold plunger 42 and being pivotally mounted at 91 and 92 in the arms 93 and 94 so that the pivotal points of these rollers are coincident with the pivotal points of the levers 87 and 88. At their opposite ends these levers are provided with rollers normally maintained in contact with the surface of a cam 113 by means of which they are operated to actuate the pins as aforesaid.

After the knobs or other articles have been formed, that is pressed to shape and the cylinder has turned another partial revolution, the mold plungers are brought to the lowermost position and the mold plungers are moved outwardly to discharge the knobs or other articles. This is accomplished by means of the bolts 58 and 59 operated by a lever 114. This lever is pivotally mounted as indicated at 115 in the arm 99 of the bracket 73 and at one end is provided with a roller 116 normally maintained in contact with the surface of a cam 117, while at its opposite end this lever carries a cross bar 114' which is adapted to contact with the heads of the bolts to move the same downwardly and to thereby move the plate 50' and the mold plungers 51, 52 and 53 from the position in which their outer ends lie within the plate 50 to that in which the outer ends of these mold plungers lie appreciably on the exterior of the plate 50. In this position the articles as formed are delivered or freed from the plungers. It will be understood of course, that when the cylinder is in the opposite position the bolts 60 and 61 will be similarly actuated to move the base 45 and the mold plungers 42, 43 and 44 from the position in which their outer ends lie within the plate 37 to a similar position in which the outer ends of these mold plungers are exterior of the plate 37.

The apparatus also includes a conveyor as indicated at 118. This conveyor passes around drums 119, 120 mounted on suitably journaled shafts 121 and 122. The conveyor is driven in any suitable manner so as to have imparted thereto an intermittent movement which corresponds to that of the cylinder. As illustrated, on the drive shaft 15 there is a mutilated gear 123 adapted to mesh with a gear 124 mounted on a sleeve on the shaft 26. Mounted on the sleeve there is a sprocket 125 which engages the conveyor to drive the same. As illustrated, the conveyor is fitted with suitably spaced pins 126 adapted as the conveyor moves to engage and remove a tray 127 from the bottom of a pile of these trays which are superimposed upon each other and maintained normally in place in a tray frame 128. In its travel this conveyor passes directly beneath the cylinder of the apparatus and on the drive shaft 15 there is a cam 129 which is adapted to raise the conveyor each time its movement is stopped so as to receive the molded articles on the tray which is carried by the conveyor and is then placed immediately beneath the cylinder so as to receive these molded articles. Moreover, a set of rollers 130 carried by a shaft 131 journaled in bearings in brackets 132 may be employed to insure the return of the conveyor to its proper level before the trays reach the station at which they and the articles thereon are lifted from the conveyor.

Figure 3:
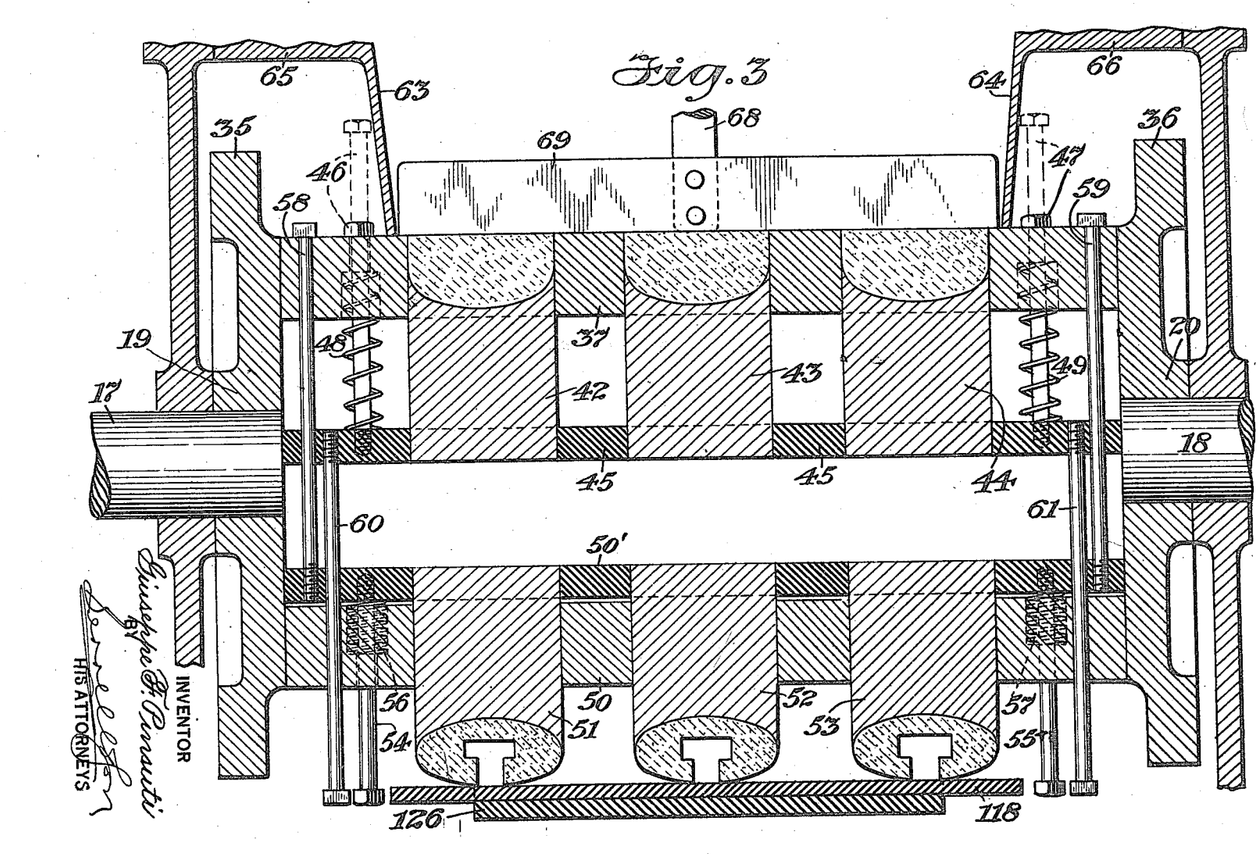
Fig. 3 is an enlarged longitudinal section through the revoluble cylinder and associated parts.

In the operation of the apparatus as hereinbefore described the drive shaft 15 is turned continuously by means of the pulley 23 and a suitable belt from any source of power or otherwise. The drive shaft through the mutilated gear 24 intermittently engages the gear 25 and this gear intermittently drives the gear 27 and the cylinder 34 with the mold frames therein. A correspondingly intermittent movement is also transmitted from the gear 27 to the gear 28 to impart a corresponding movement to the shaft 21 and the blades or paddles carried thereby. The plastic composition from which the door knobs or other articles are to be formed is placed in the hopper 62. As the cylinder reaches the position shown in Figs. 1 and 3, its motion is interrupted and quantities of the plastic material are passed into the openings 39, 40 and 41 so as to fill the same. When this is accomplished the cylinder is turned a quarter revolution and again brought to a state of rest. While in this position the pins 107, 108 are actuated to engage the cylinder to maintain the same in a revolubly fixed position. Simultaneously the reciprocating shafts 70, 71 and 72 are operated to bring the compressor heads 80 into engagement with the material in the mold frames to shape or form the material and simultaneously the arms 83 and 84 are actuated to swing the curved short ends thereof away from each other to provide the undercut recess in the article being molded. The arms 83 and 84 are then freed and the reciprocating shafts moved in the opposite direction to withdraw the compressor heads from the plunger frames. In passing from the first to the second position as hereinbefore stated the follower roller 106 engages the edges defining the openings 39, 40 and 41 to wipe or scrape the same, and as will be understood, before the first aforesaid position is reached the advance roller 106 performs the same function. The cylinder is then given a third quarter turn in which the mold plungers having the formed articles therein are in the lowermost position and the mold plungers are moved outwardly by the downard movement of the bolts 58 and 59 through the intervention of the lever 114 and the cam 117. These articles are then freed from the mold plungers and deposited on the trays carried by the conveyor 118, which as will be understood has imparted thereto an intermittent movement by means of the mutilated gear 123, the teeth of which successively engage with the teeth of the gear 124, to turn the sprocket 125 for driving the conveyor. It will furthermore be understood that the gears 29 and 31 are so related to the gears 24 and 25' that the gear 31 and the cam shaft actuated thereby are turned two revolutions for each revolution of the cylinder 34. When the cylinder is in this third quarter position the mold plungers 51, 52 and 53 are in place for receiving the plastic composition from which the articles are molded. The cylinder 34 is then turned another quarter revolution and stopped for a like period, during which period, however, there is no operation performed by the parts of the machine. It will also be understood that after the molded articles on the trays upon which they are deposited reach a predetermined station on the conveyor the trays may be removed and transferred to a suitable place for drying or other purposes.

I claim as my invention:

1. In a molding machine, an intermittently driven cylinder, a molding device carried by the cylinder, means for placing a molding material in the molding device when the cylinder is in one position, means for shaping the said material and forming an undercut recess therein when the cylinder is in a second position, and means for removing the shaped material when the cylinder is in a third position.

2. In a molding machine, an intermittently driven cylinder, a molding device carried by the cylinder, means for placing a molding material in the molding device when the cylinder is in one position, means for shaping the material when the cylinder is in a second position, means for forming an undercut recess in the said material when the cylinder is in the said second position, and means for removing the shaped material when the cylinder is in a third position.

3. In a molding machine, an intermittently driven cylinder, a plate having an opening therein fixed in the cylinder, a molding plunger movable radially in the said plate and having its outer end shaped to form part of an article to be molded, means when the cylinder is in one position for forcing material to be molded into the opening in the plate and against the shaped end of the plunger, means operative when the cylinder is in a second position for cooperating with the said plunger to shape the said material, means operative when the cylinder is in the last aforesaid position for forming an undercut recess in the said material, and means operative when the cylinder is in a third position to move the said plunger to eject the shaped material therefrom.

4. In a molding machine, an intermittently driven cylinder, a plate having an opening therein fixed in the cylinder, a molding plunger movable radially in the said plate and having its outer end shaped to form part of an article to be molded, means when the cylinder is in one position for forcing material to be molded into the opening in the plate and against the shaped end of the plunger, means operative when the cylinder is in a second position for cooperating with the said plunger to shape the said material, means operative when the cylinder is in the last aforesaid position for forming an undercut recess in the said material, means operative when the cylinder is in a third position to move the said plunger to eject the shaped material therefrom, and an intermittently movable conveyor for receiving the shaped material.

5. In a molding machine, an intermittently driven cylinder, a plate having an opening therein fixed in the cylinder, a molding plunger movable radially in the said plate and having its outer end shaped to form part of an article to be molded, means when the cylinder is in one position for forcing material to be molded into the opening in the plate and against the shaped end of the plunger, means operative when the cylinder is in a second position for maintaining the plunger in a fixed position relatively to the cylinder and the plate therein, means also operative when the cylinder is in the second position for shaping the said material, means operative when the cylinder is in the said second position for forming an undercut recess in the said material, and means operative when the cylinder is in a third position for shifting the said plunger radially and removing the shaped material therefrom.

6. In a molding machine, an intermittently driven cylinder, a plate having an opening therein carried by the cylinder, a molding plunger movable radially in the opening in the said plate and having its outer end recessed to shape a part of an article to be molded in the machine, means for normally maintaining said plunger in an initial position, devices operative when the cylinder is in one position for forcing material to be molded into the opening and against the outer face of the said plunger, a compressor head, pivotally mounted arms carried by the said compressor head, means for actuating the said arms when the cylinder is in a second position for making an undercut recess in the said material, means for actuating the compressor head when the cylinder is in the said second position to enter the opening in the said plate and to cooperate with the said plunger for shaping the said material, and means operative when the cylinder is in a third position for shifting the said plunger radially to remove the shaped material therefrom.

7. In a molding machine, an intermittently driven cylinder, a plate having an opening therein carried by the cylinder, a molding plunger movable radially in the opening in the said plate and having its outer end recessed to shape a part of an article to be molded in the machine, means for normally maintaining said plunger in an initial position, devices operative when the cylinder is in one position for forcing material to be molded into the opening and against the outer face of the said plunger, pins adapted to engage the said cylinder when the same is in a second position to temporarily maintain the said cylinder in a revolubly fixed position, a compressor head, pivotally mounted arms carried by the said compressor head, means for actuating the said arms when the cylinder is in a second position for making an undercut recess in the said material, means for actuating the compressor head when the cylinder is in the said second position to enter the opening in the said plate and to cooperate with the said plunger for shaping the said material and means operative when the cylinder is in a third position for shifting the said plunger radially to remove the shaped material therefrom.

8. In a molding machine, a hollow revoluble cylinder having a longitudinal opening therein, a plate adapted to fit and be fixed in place in the longitudinal opening in the cylinder and having an opening therein, a base lying within the cylinder, a molding plunger carried by the base and adapted to move in the opening in the plate, means for yieldingly maintaining the said base in that position within the cylinder for causing the outer face of the molding plunger to lie within the opening within the plate, and devices carried by the said base and operable to move the same toward the said plate to cause the outer end of the said molding plunger to protrude beyond the said plate.

9. In a molding machine, a hollow revoluble cylinder having a longitudinal opening therein, a plate adapted to fit and be fixed in the longitudinal opening in the cylinder and having a plurality of openings therein, a base lying within the cylinder, a plurality of spaced molding plungers carried by the said base each adapted to move radially in one of the said openings in the plate, means for yieldingly maintaining the said base in that position within the cylinder in which the outer end of each of the molding plungers lies within its opening in the said plate, and devices carried by the said base and operable for moving the same toward the said plate for causing the outer ends of the said molding plungers to protrude beyond the outer surface of the said plate.

10. In a molding machine, a hollow revoluble cylinder having longitudinal openings in oppositely disposed positions therein, plates each adapted to fit and to be fixed in position in one of the said openings in the cylinder and each having a plurality of openings therein, bases lying within the said cylinder, a plurality of molding plungers carried by the said bases and each adapted to move radially in one of the openings in one of the said plates, means for yieldingly maintaining each of the said bases in a normal position within the cylinder in which the molding plungers carried by the bases are so positioned that their outer ends lie within the corresponding openings in the said plates, and means carried by the said bases and operable to move the same toward the said plates to cause the outer ends of the said molding plungers to protrude beyond the faces of the said plates.

11. In a molding machine, a hollow cylinder having a longitudinal opening therein, means for imparting an intermittent revoluble movement to the said cylinder, a plate adapted to fit and be fixed in place in the said longitudinal opening in the cylinder and having an opening therein, a base lying within the cylinder, a molding plunger caried by the base and adapted to move radially in the opening in the plate, means for yieldingly maintaining the base in a position within the cylinder in which the outer face of the molding plunger lies within the opening in the plate, devices carried by the base and operable to move the same toward the said plate to cause the outer end of the molding plunger to protrude beyond the plate, means operable when the cylinder is in one position for forcing material to be molded into the opening in the plate and against the outer end of the said molding plunger, means operative when the cylinder is in another position for compressing the material to be molded, and means operative when the cylinder is in another position for actuating the said devices carried by the base for moving the same toward the plate in order to cause the outer end of the molding plunuger to protrude beyond the plate and thereby eject the molded material.

12. In a molding machine, a hollow cylinder having a longitudinal opening therein, means for imparting an intermittent revoluble movement to the said cylinder, a plate adapted to fit and be fixed in position in the longitudinal opening in the cylinder and having a plurality of openings therein, a base lying within the cylinder, a plurality of spaced molding plungers carried by the base and each adapted to move radially in one of the said openings in the plate, means for yieldingly maintaining the base in that position within the cylinder in which the outer end of each of the molding plungers lies within its opening in the said plate, devices carried by the base and operable for moving the same toward the plate for causing the outer ends of the said molding plungers to protrude beyond the outer surface of the plate, devices operative when the cylinder is in one position for forcing material to be molded into the said openings in the plate and against the outer ends of the said molding plungers, means operative when the cylinder is in a second position for co-operating with the molding plungers to shape the said material to be molded, and means operative when the cylinder is in a third position for actuating the said devices for moving the base toward the plate to cause the outer ends of the molding plungers to protrude beyond the surface of the plate to thereby eject the molded material.

13. In a molding machine, a revoluble cylinder having oppositely disposed longitudinal openings therein, means for imparting an intermittent revoluble movement to the said cylinder, plates each adapted to fit and be fixed in position in one of the longitudinal openings in the cylinder, bases lying within the cylinder each associated with one of the said plates, a plurality of molding plungers carried by each of the said bases, each molding plunger being adapted to move radially in one of the openings in one of the said plates, means for yieldingly maintaining each of the said bases in a normal position within the cylinder in which the molding plungers carried by the bases are so positioned that their outer ends lie within the corresponding openings in the said plates, means carried by the plungers and operable to move each base toward the plate with which it is associated to cause the outer ends of the corresponding molding plungers to protrude beyond the face of the corresponding plate, means operative when the cylinder is in one position for forcing material to be molded into the openings in one of the said plates and against the outer ends of the said molding plungers, means operative when the cylinder is in a second position for cooperating with the molding plungers to shape the material to be molded, and means operative when the cylinder is in a third position for actuating the said means carried by the bases for moving one of the said bases toward the corresponding plate to cause the outer ends of the molding plungers to protrude beyond the surface of the corresponding plate and thereby eject the molded material.

Signed by me this 2nd day of July, 1926.

GIUSEPPE F. PINSUTI.